(12) United States Patent
Russo et al.

(10) Patent No.: US 7,648,007 B2
(45) Date of Patent: Jan. 19, 2010

(54) DISC BRAKE PAD WITH FRICTION ELEMENTS, PARTICULARLY TO BE EMPLOYED IN THE RAILWAY FIELD

(75) Inventors: Sergio Russo, Avellino (IT); Vittorio De Soccio, Avellino (IT)

(73) Assignee: Cofren S.r.l., Avellino (IT)

( * ) Notice: Subject to any disclaimer, the term of this patent is extended or adjusted under 35 U.S.C. 154(b) by 229 days.

(21) Appl. No.: 11/109,263

(22) Filed: Apr. 19, 2005

(65) Prior Publication Data

US 2006/0151267 A1 Jul. 13, 2006

(30) Foreign Application Priority Data

Jan. 10, 2005 (IT) .......................... RM2005A0005

(51) Int. Cl.
*F16D 69/04* (2006.01)
(52) U.S. Cl. ............................. 188/250 E; 188/250 B; 188/250 G
(58) Field of Classification Search .............. 188/250 E, 188/250 G, 250 B
See application file for complete search history.

(56) References Cited

U.S. PATENT DOCUMENTS

| 4,501,347 | A | * | 2/1985 | Cerny et al. ............. 188/250 G |
| 5,538,108 | A | * | 7/1996 | Russo ..................... 188/250 E |
| 5,934,418 | A | * | 8/1999 | Wirth ........................ 188/73.1 |
| 6,478,125 | B1 | * | 11/2002 | Russo et al. ............. 188/250 E |

* cited by examiner

*Primary Examiner*—Bradley T King
(74) *Attorney, Agent, or Firm*—Dann, Dorfman, Herrell and Skillman; Henry H. Skillman

(57) ABSTRACT

A disc brake pad (1) comprising a base plate (2), on which elongated elements for supporting friction elements (3) are fixed. The friction elements (3) are mounted, alone or in groups, on the ends of elastic support elements (4), the support elements (4) being cantilevered on the base plate (2) to provide projecting and freely movable ends which support the friction elements (3). The support elements (4) are placed on the base plate (2) with their main longitudinal axis oriented substantially perpendicular with respect to a ray passing through the centre of the brake disc. The disc brake pad centre coincides with rotary axis of the wheel or other rotating element to be braked. The circular portion or band of the element on which each friction element acts is as narrow as possible, thereby minimizing the peripheral speed difference between inner circumference and outer circumference of the annular bands engaged by the friction elements.

14 Claims, 7 Drawing Sheets

DISC BRAKE PAD WITH FRICTION ELEMENTS, PARTICULARLY TO BE EMPLOYED IN THE RAILWAY FIELD

FIELD OF INVENTION

The present invention relates generally to an improved disc brake pad with friction elements, particularly to be employed in the railway field.

BACKGROUND OF THE INVENTION

More specifically, the invention concerns an improvement in brake pads allowing to noticeably reducing noise of the known brakes.

As it is well known, in the recent years, particular attention was paid to the braking devices for railway vehicles, also bearing in mind the always higher speed that said vehicles must reach.

In this context, a particular development had the solution according to the Italian Patent No. 1,261,780 filed on Apr. 5, 1993 (corresponding to U.S. Pat. No. 5,538,108), and concerning a "disc brake pad with sintered friction elements".

The solution suggested in the above Italian patent concerns a pad wherein the single sintered friction elements, having a cylindrical or polyhedral shape, are mounted in small groups on elastic metallic laminas, on their ends. The metallic laminas are fixed by spacers to a base plate, in such a way that each end of the lamina comprises an independently movable bracket, to absorb deformations due to thermal load and thus realising an uniform contact pressure between the single friction elements and the brake disc. Said solution has very good operative features, confirmed by the wide use of the same brakes.

However, the solution suggested in said patent has some problems relevant to the noise of the pad during the braking action, noise that is very irksome.

SUMMARY OF THE INVENTION

In view of the above, the Applicant has studied an improvement to the pad described in the above-mentioned prior art patent, said improvement allowing reducing, if not completely eliminating, the above noise problem. These and other results are obtained, according to the present invention, suggesting the realisation of a pad, on which friction elements are provided by being mounted on an elongated support element composed of elastic metallic laminas and coupled with a base plate by spacers, wherein positioning and sizes of said friction elements is such to make the circular portion or disc of the disc on which each friction element or pair of friction elements acts as narrow as possible, minimising the peripheral speed difference between inner diameter and outer diameter of said portion or band. Optimum dimension of the portion or band is up to 40 mm for single friction element and up to 50 mm for each pair of elements mounted on a single support.

It is therefore a specific object of the present invention to provide a disc brake pad, particularly to be employed in the railway field, comprising a base plate, on which elements for supporting friction elements are fixed, said friction elements being mounted, alone or in pairs, on the end of elastic support elements, said support elements being fixed spaced on the base plate by fixing means, in such a way that the friction elements are placed on the projecting and freely movable ends of said support elements, said pad being characterised in that said support elements are placed on said base plate with their main axis oriented substantially perpendicular with respect to a ray passing through the center of the brake disc.

Always according to the invention, said friction elements have a substantially polygonal or circular cross section shape.

Furthermore, according to the invention, it is possible to provide one, two or three friction elements on each support element.

In a preferred embodiment of the pad according to the invention, it comprises an elastic support comprised of two superimposed elastic elements, centrally coupled to each other, thus obtaining a variation of the flexion rigidity of the elastic element, the lower elastic element being provided with two projections, the contact between the lower and the upper elastic elements occurring only in correspondence of the central coupling and of the ends with projections, thus creating a pre-loading of the upper elastic element.

Still according to the invention, said friction elements are comprised of sintered material.

Further, according to the invention, said support elements can be comprised of elastic metallic laminas.

According to the invention, said friction elements can be riveted by a proper metallic support on said support elements.

Furthermore, according to the invention, a highly thermo-stable insulating or dampening layer could be interposed between said support elements and the base plate.

Still according to the invention, an insulating or dampening layer can be interposed between said friction elements and the relevant support element.

BRIEF DESCRIPTION OF THE DRAWINGS

The present invention will now be described, for illustrative and not limitative purposes, according to its preferred embodiments, making particular reference to the figures of the enclosed drawings, wherein.

DESCRIPTION OF THE PREFERRED EMBODIMENTS

Figure 1:
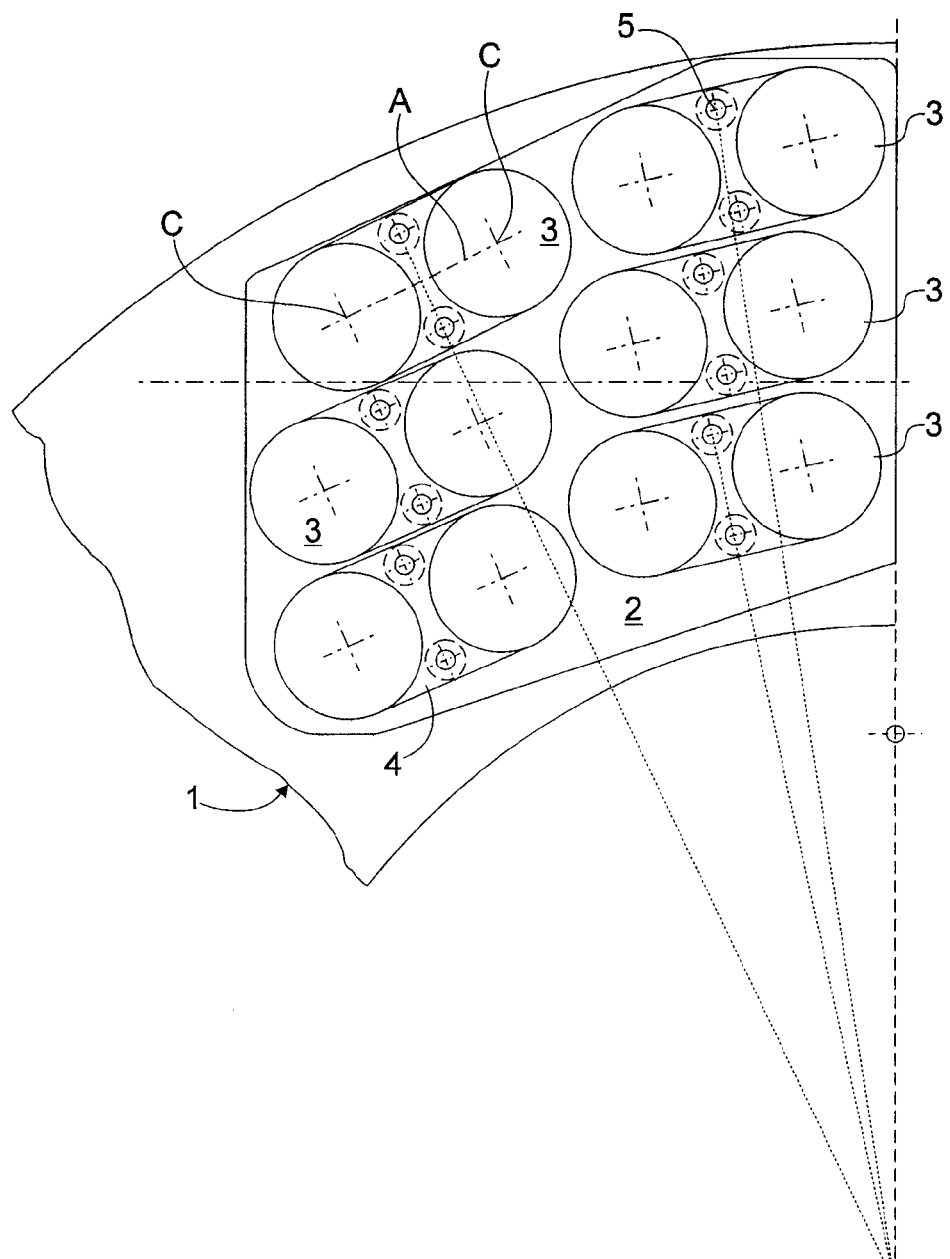
FIG. 1 is a partial view of a first embodiment of the pad according to the invention.
Figure 2:
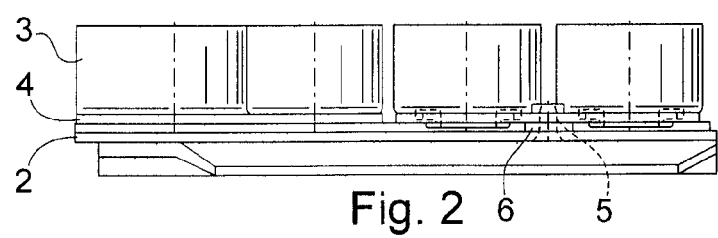
FIG. 2 is a front view of the pad of FIG. 1.

Making reference first to FIGS. 1 and 2 of the enclosed drawings, it is shown a brake disc pad 1 providing a base plate 2, on which pairs of friction elements 3 are provided, riveted at 5 in elongated flexible support elements 4 comprising steel metallic laminas. Spacers 6 are provided between plate 2 and metallic lamina 4, it also being possible to make said spacer 6 integral with the rivets 5.

Coupling features between metallic laminas 4 and plate 2 are preferably as described and claimed in the above-mentioned Italian Patent No. 1,261,780 (U.S. Pat. No. 5,538,108). As in this patent, the friction elements 3 are mounted on the elongated supports 4 alone or in small groups.

However, in the solution according to the present invention, friction elements 3 have their centres C spaced apart along the main axis A of the plate 2, which is oriented substantially perpendicular with respect to the ray R of the pad. Particularly, as it can be seen from FIG. 1, a ray of pad according to the invention originates at the disc centre, which coincides with the rotary axis of the wheel or other rotary element (not shown) to be braked, and passes through the fixing rivets 5 of laminas 4 on the plate 2.

In this way, a positioning of friction elements 3 is obtained employing the lowest overall dimensions in a radial direction with respect to the same pad.

Figure 3:
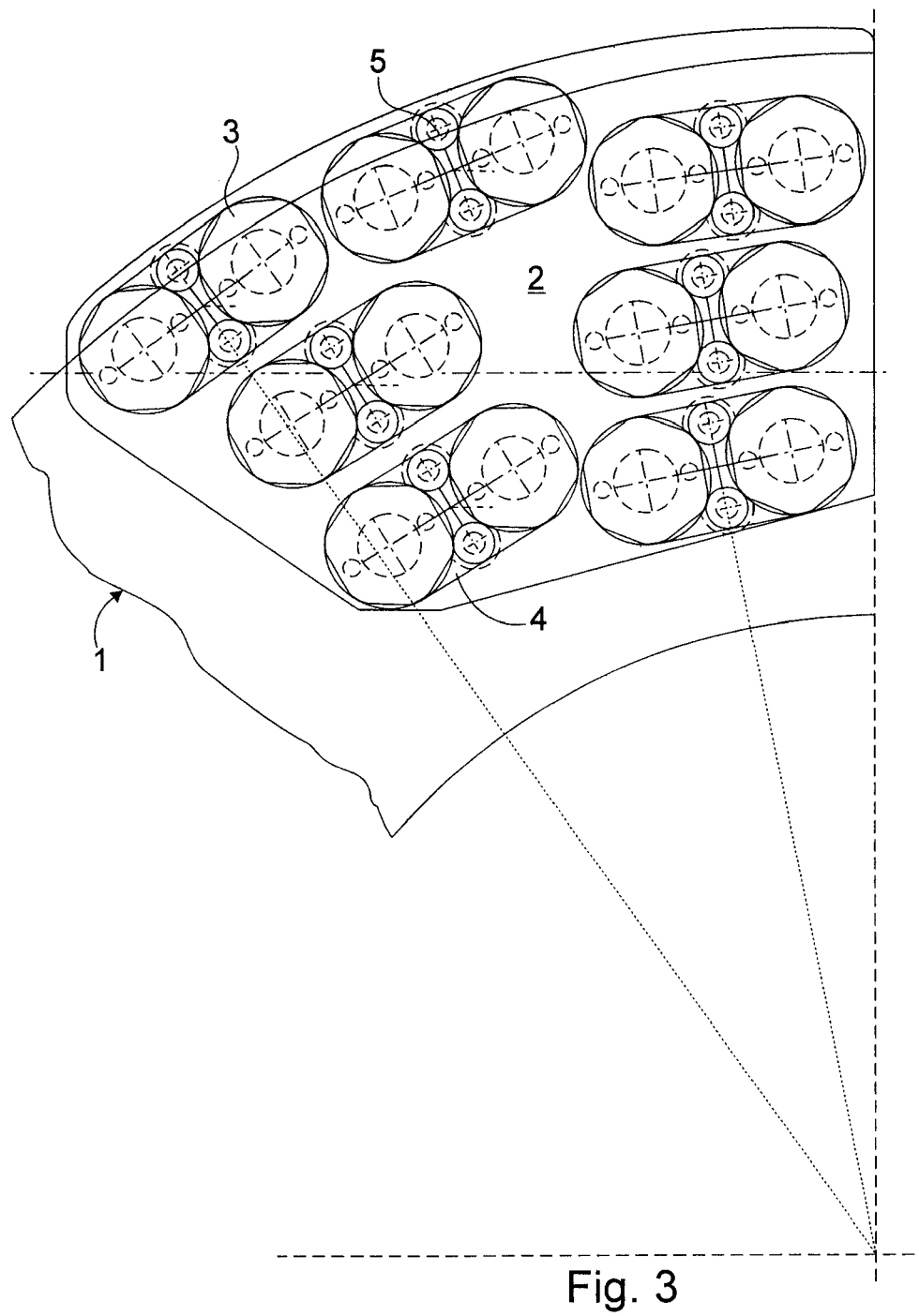
FIG. 3 is a partial view of a second embodiment of the pad according to the invention.
Figure 4:
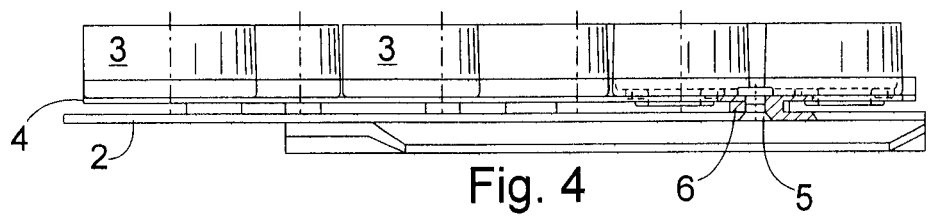
FIG. 4 is a front view of the pad of FIG. 3.

Observing now FIGS. 3 and 4 of the enclosed drawings, it is shown a second embodiment of the pad according to the invention. The same references will be used in these figures to indicate elements corresponding to elements of the previous figures.

Difference with respect to the previous embodiment mainly consists in the shape of the friction element 3, in this case having a polygonal shape instead of the circular shape of the previous embodiment.

Figure 5:
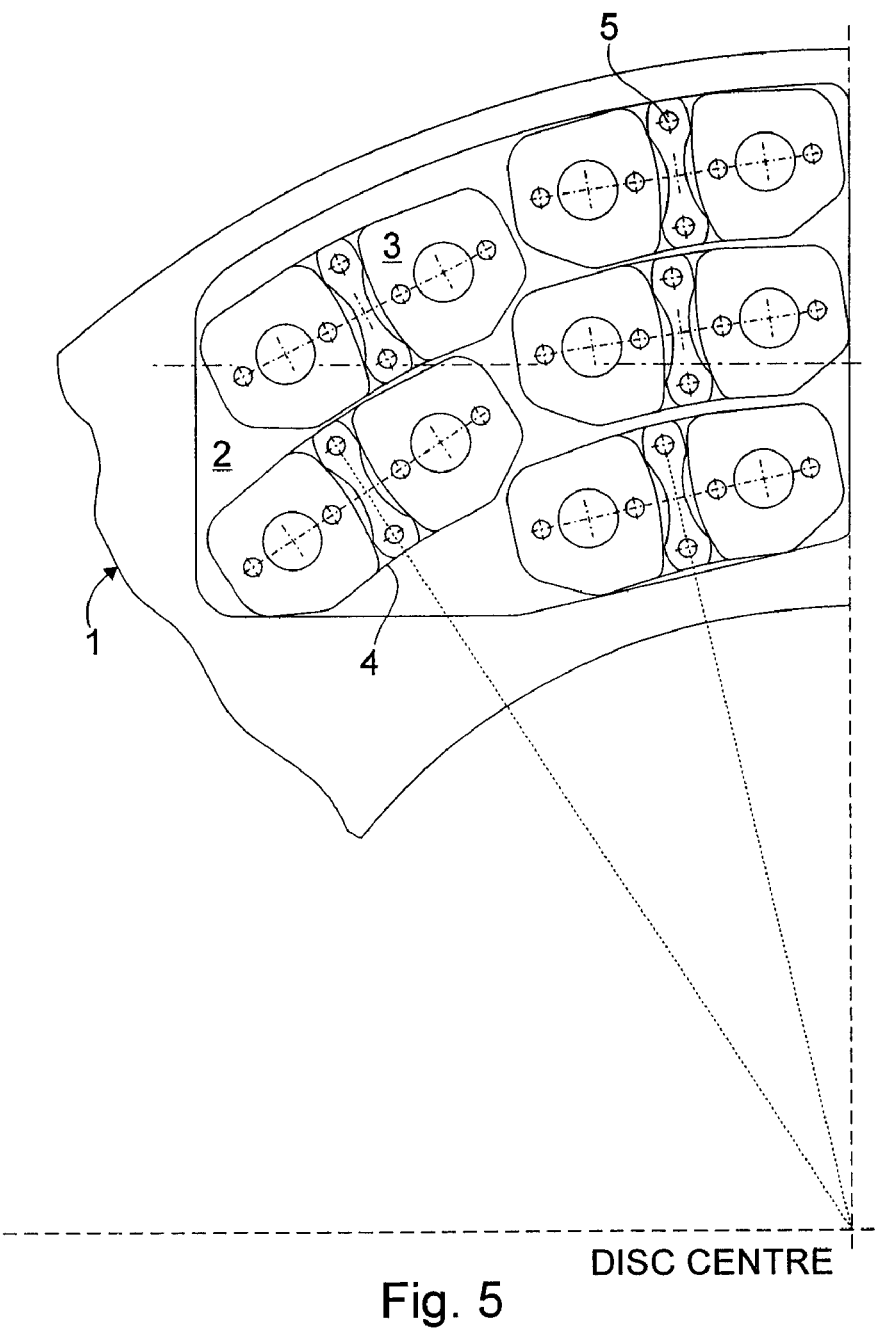
FIG. 5 is a partial view of a third embodiment of the pad according to the invention.
Figure 6:
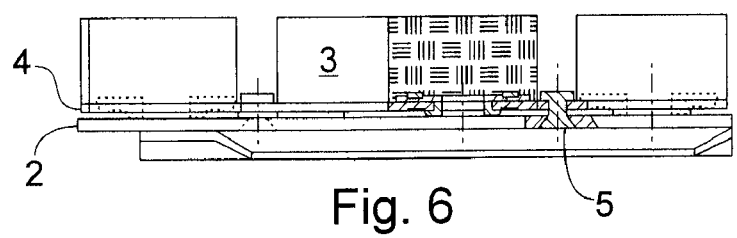
FIG. 6 is a front view of the pad of FIG. 4.

Coming now to observe FIGS. 5 and 6 of the enclosed drawings, it is shown a third embodiment of the pad according to the invention. The same references will be used in these figures to indicate elements corresponding to elements of the previous figures. In this case, the shape of the friction pad 3 is such to optimise the occupation of space on plate 2, so as to obtain the higher density of friction elements on the surface of the plate 2, always respecting the orientation and positioning restraints for the same friction elements It is noted that there are at least three support elements 4 which have their longitudinal axes at different orientations, determined by their respective angular positions about the rotary axis at the center of the disc 1.

Figure 7:
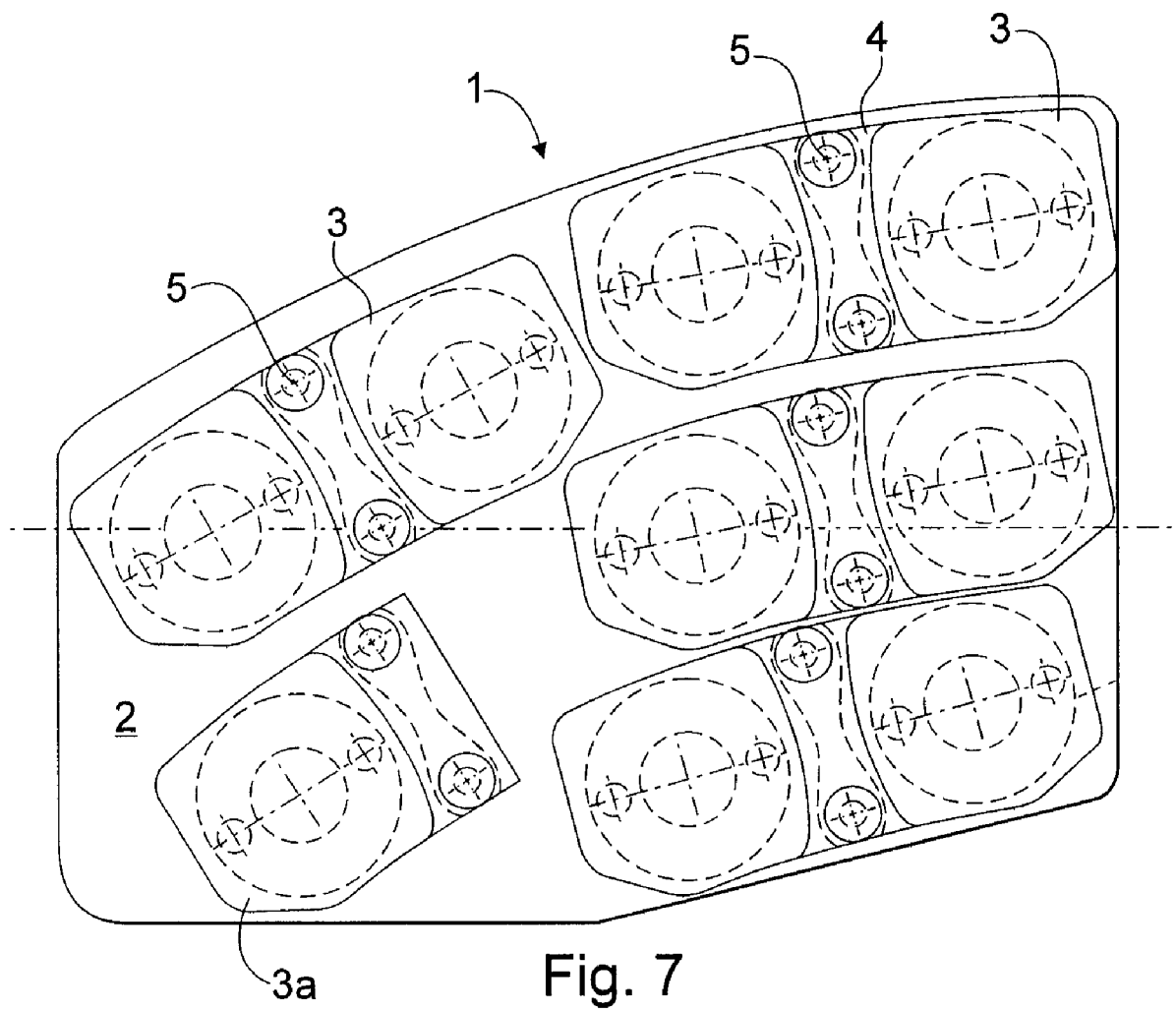
FIG. 7 is a partial view of a fourth embodiment of the pad according to the invention.

A fourth embodiment of the pad 1 according to the invention is shown in FIG. 7, wherein a support element 4 is provided, cantilevered by the coupling elements 5 on the plate 2, and consequently providing a single friction element 3.

Figure 8:
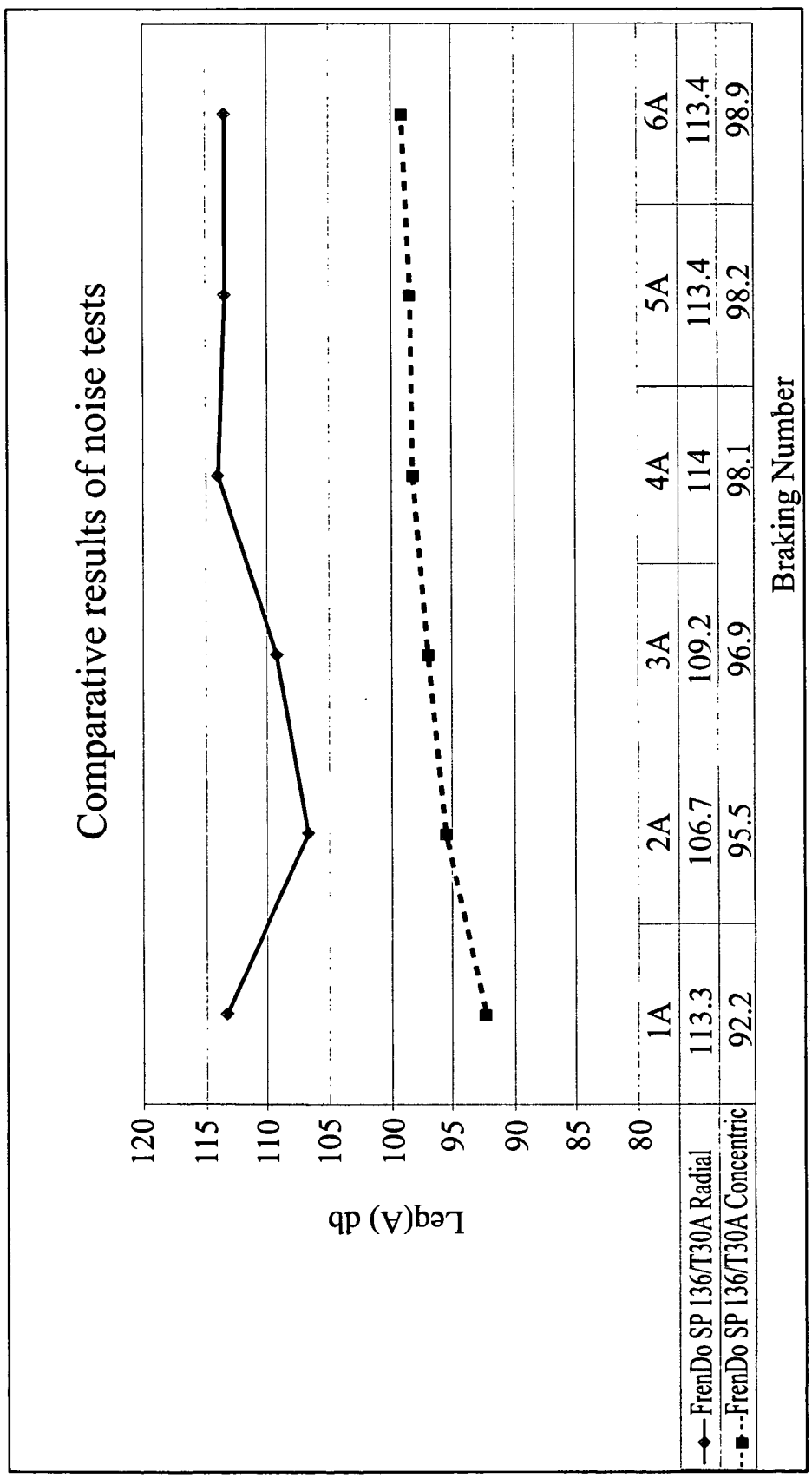
FIG. 8 shows a comparative graph of the results relevant to the noise measures of the pad according to the invention with respect to the prior art pads.

Observing then FIG. 8, it is shown a graph having in abscissa the number of brakings and in ordinates the noise level, curve A representing the results obtained by the invention and curve B those obtained employing a known pad.

Reduction of noise obtained is well clear and evident.

Figure 10:
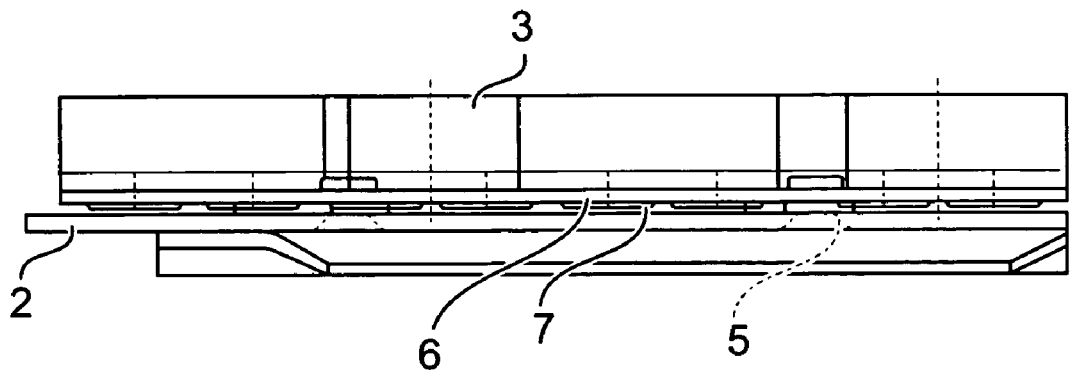
FIG. 10 is a front view of the pad of FIG. 9.
Figure 9:
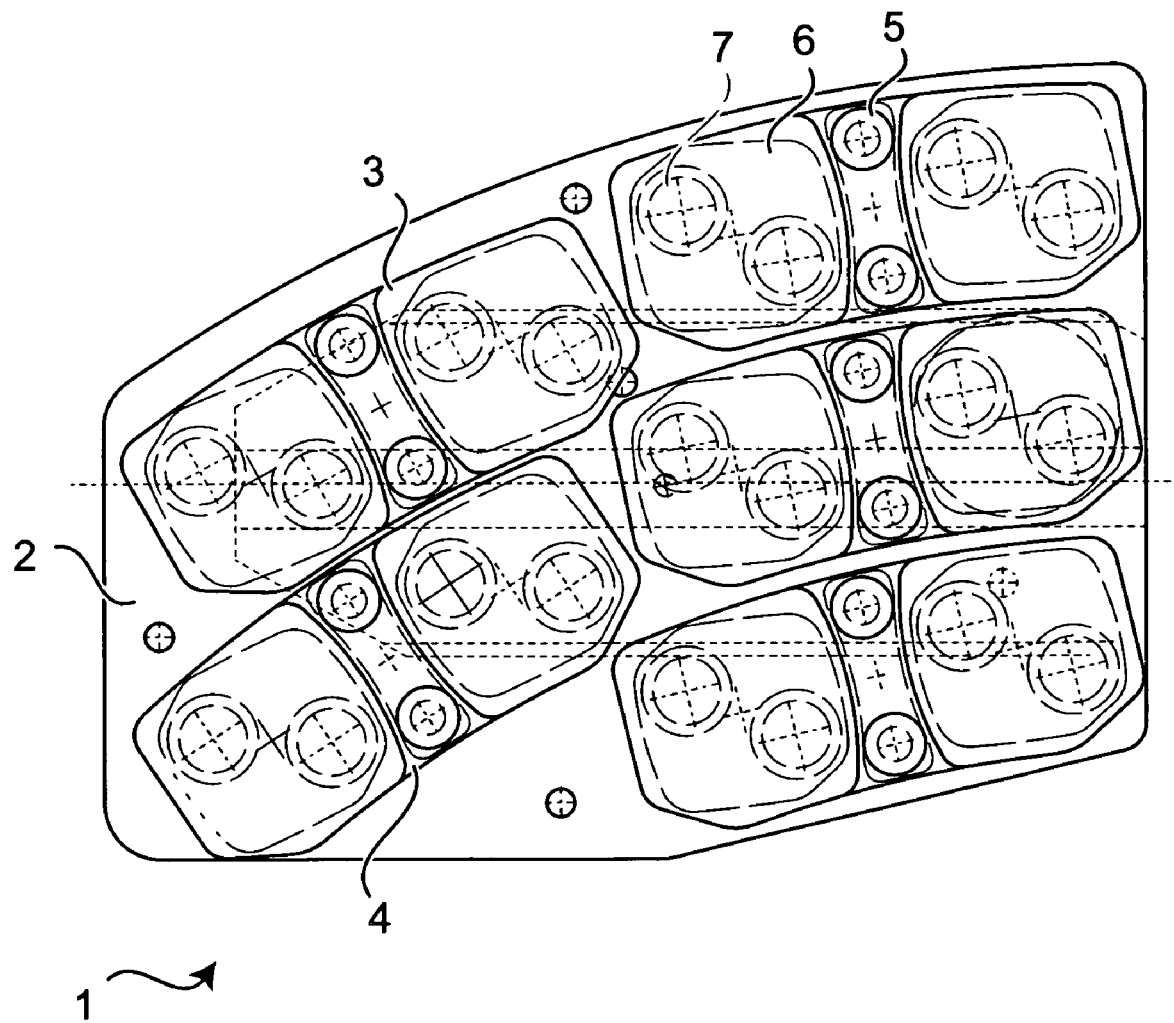
FIG. 9 is a partial view of a fifth embodiment of the pad according to the invention.
Figure 11:
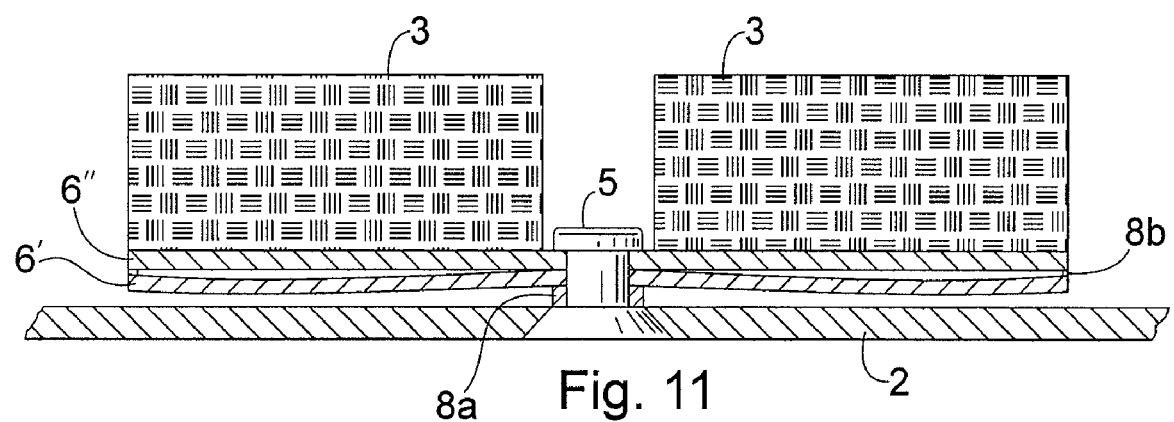
FIG. 11 is an enlarged fragmentary sectional view of the pad of FIG. 10.

Coming now to observe FIGS. 9-11 of the enclosed drawings, it is shown a fifth embodiment of the pad according to the invention, providing an elastic support 6 comprised of two superimposed elastic elements 6',6" (FIG. 11), coupled to each other by two central rivets 7, thus obtaining a variation of the bendiing flexibility of the elastic element.

The lower elastic element 6' is provided with two projections 8a and 8b. The contact between the two elastic elements 6',6" occurs only at 6a surrounding the rivets 7 and at the projections 8b at the free ends of the elastic elements 6' and 6". In this way, a pre-loading of the upper elastic element 6" is obtained, thus creating optimum operative conditions, also in view of the fact that the most critical condition during the operation (maximum noise) occurs in the presence of a low standard load (braking force). By this solution, a higher result is obtained both as far as the noise and the efficiency under wet conditions are concerned.

The present invention has been described for illustrative but not limitative purposes, according to its preferred embodiments, but it is to be understood that modifications and/or changes can be introduced by those skilled in the art without departing from the relevant scope as defined in the enclosed claims.

The present invention has been described for illustrative but no limitative purposes, according to its preferred embodiments, but it is to be understood that modifications and/or changes can be introduced by those skilled in the art without departing from the relevant scope as defined in the enclosed claims.

The invention claimed is:

1. Disc brake pad for a brake disc having a centre adapted to coincide with the rotary axis of the brake disc, comprising friction elements including a plurality of small groups of friction elements, a base plate, and consisting of a plurality of elongated support elements, each of said elongated support elements having fixing means in the middle, a main longitudinal axis oriented substantially perpendicular with respect to a ray passing through said fixing means and the rotary axis at the centre of the brake disc pad, and projecting and freely movable ends, each of said small groups being mounted on one of said support elements, said support element supporting the associated small group of friction elements so that each element in the group is spaced from said fixing means, said fixing means mounting the support element associated with said fixing means spaced from the base plate, whereby the longitudinal axis of each support element of said pad has an orientation determined by the angular position of said ray about said rotary axis, all of said elements in each of said small groups being centered on said main longitudinal axis of an associated one of said support elements.

2. Disc brake pad according to claim 1, wherein each friction element has a width parallel to said ray, characterised in that said width is narrow minimising the peripheral speed difference between the inside edge and outside edge of said friction element.

3. Disc brake pad according to claim 2, characterised in that said width is in the range of less than 50 mm.

4. Disc brake pad according to claim 1, characterised in that said friction elements have a substantially polygonal outline.

5. Disc brake pad according to claim 1, characterised in that said friction elements have a substantially circular outline.

6. Disc brake pad according to claim 1, wherein said support element is elastic and is comprised of two superimposed elastic elements, centrally coupled each other, thus obtaining a variation of the bending flexibility of the elongated elastic support, the lower elastic element being provided with two projections, the contact between the lower and the upper elastic elements occurring only in correspondence of the central coupling and of the ends with projections, thus creating a pre-loading of the upper elastic element.

7. Disc brake pad according to claim 1, characterised in that said friction elements are comprised of sintered material.

8. Disc brake pad according to claim 1, characterised in that said support elements are comprised of elastic metallic laminas.

9. Disc brake pad according to claim 1, characterised in that said friction elements are riveted by a metallic fastener on said support elements.

10. Disc brake pad according to claim 1, characterised in that a highly thermo-stable insulating or dampening layer is interposed between said support elements and the base plate.

11. Disc brake pad according to claim 1, characterised in that an insulating or dampening layer is interposed between said friction elements and the associated support element.

12. Disc brake pad according to claim 1, wherein at least one of said small groups of friction elements comprises a pair of elements spaced apart along said main axis.

13. Disc brake pad according to claim 1, characterised in that there are two friction elements on each support.

14. Disc brake pad according to claim 1, characterised in that there are at least three support elements on said base plate at different angular positions about said rotary axis, and with their longitudinal axes at different orientations.

* * * * *